US010003976B2

(12) United States Patent
Zhang et al.

(10) Patent No.: US 10,003,976 B2
(45) Date of Patent: Jun. 19, 2018

(54) RESOURCE SELECTION METHOD AND APPARATUS (71) Applicant: Huawei Technologies Co., Ltd., Shenzhen, Guangdong (CN)

(72) Inventors: Qizhi Zhang, Shenzhen (CN); Qiang Li, Doha (QA)

(73) Assignee: Huawei Technologies Co., Ltd., Shenzhen (CN)

( * ) Notice: Subject to any disclaimer, the term of this patent is extended or adjusted under 35 U.S.C. 154(b) by 60 days.

(21) Appl. No.: 15/261,349

(22) Filed: Sep. 9, 2016

(65) Prior Publication Data

US 2016/0381562 A1 Dec. 29, 2016

Related U.S. Application Data

(63) Continuation of application No. PCT/CN2014/073217, filed on Mar. 11, 2014.

(51) Int. Cl.
*H04W 16/10* (2009.01)
*H04W 8/00* (2009.01)
(Continued)

(52) U.S. Cl.
CPC .......... *H04W 16/10* (2013.01); *H04W 8/005* (2013.01); *H04W 48/16* (2013.01); *H04W 48/20* (2013.01); *H04W 88/02* (2013.01); *H04W 88/08* (2013.01)

(58) Field of Classification Search
None
See application file for complete search history.

(56) References Cited

U.S. PATENT DOCUMENTS

2004/0146064 A1 7/2004 Kramer
2014/0112194 A1* 4/2014 Novlan ............... H04W 48/16
370/254
(Continued)

FOREIGN PATENT DOCUMENTS

CN 102939788 A 2/2013
CN 103338497 A 10/2013
(Continued)

OTHER PUBLICATIONS

LG Electronics, "Resource Allocation and UE Behavior for D2D Discovery", 3GPP TSG RAN WG1 Meeting #75, R1-140337, Prague, Feb. 10-14, 2014, 7 pages.
(Continued)

*Primary Examiner* — Mohammad S Adhami (57) ABSTRACT

Embodiments of the present disclosure disclose a resource selection method and an apparatus, which are applied to the communications field, and can resolve a collision problem occurring, and improve transmit quality of a discovery signal of a terminal. The method comprises: obtaining, by the terminal, a transmit probability of a discovery signal, where the transmit probability is a probability that the terminal starts to transmit the discovery signal on a predetermined discovery frame by using a discovery resource pool; generating, by the terminal, an indication signal corresponding to the transmit probability; and if the indication signal is a transmit indication signal, starting to transmit, by the terminal, the discovery signal on the predetermined discovery frame by using the discovery resource pool. The present disclosure is applicable to frequency-time resource selection by a terminal for transmitting a discovery signal.

14 Claims, 6 Drawing Sheets

(51) Int. Cl.
*H04W 48/16* (2009.01)
*H04W 48/20* (2009.01)
*H04W 88/02* (2009.01)
*H04W 88/08* (2009.01)

(56) References Cited

U.S. PATENT DOCUMENTS

| | | | | |
|---|---|---|---|---|
| 2014/0370904 | A1* | 12/2014 | Smith | H04W 8/005 455/450 |
| 2015/0131571 | A1* | 5/2015 | Fodor | H04W 4/70 370/329 |
| 2015/0133102 | A1* | 5/2015 | Sorrentino | H04W 8/005 455/418 |
| 2015/0163729 | A1 | 6/2015 | Seo et al. | |
| 2015/0223141 | A1* | 8/2015 | Chatterjee | H04W 40/246 370/329 |
| 2016/0255670 | A1* | 9/2016 | Lee | H04W 72/02 370/329 |
| 2016/0295595 | A1* | 10/2016 | Chae | H04W 72/00 |

FOREIGN PATENT DOCUMENTS

| | | |
|---|---|---|
| CN | 103561390 A | 2/2014 |
| CN | 103582069 A | 2/2014 |
| CN | 103596182 A | 2/2014 |
| EP | 3054733 A1 | 8/2016 |
| WO | 2013191609 A1 | 12/2013 |
| WO | 2014007556 A1 | 1/2014 |

OTHER PUBLICATIONS

Gatt et al., "WF on Resource Allocation for Type 1 D2D Discovery", 3GPP TSG RAN WG1 #76, R1-140863, Prague, Feb. 10-14, 2014, 3 pages.

LG Electronics, "Resource Allocation and UE Behavior for Discovery Type 1 and Type 2," R1-133388, 3GPP TSG-RAN WG1 Meeting #74, Barcelona, Spain, Aug. 19-23, 2013, 3 pages.

Catt, "Details of discovery signal design," R1-134115, 3GPP TSG-RAN WG1 Meeting #74bis, Guangzhou, China, Oct. 7-11, 2013, 4 pages.

Nokia, Nsn, "Resource allocation for discovery signals," R1-140575, 3GPP TSG-RAN WG1 Meeting #76, Prague, Czech Republic, Feb. 10-14, 2014, 6 pages.

* cited by examiner

RESOURCE SELECTION METHOD AND APPARATUS

CROSS-REFERENCE TO RELATED APPLICATIONS

This application is a continuation of International Application No. PCT/CN2014/073217, filed on Mar. 11, 2014, which is hereby incorporated by reference in its entirety.

TECHNICAL FIELD

The present disclosure relates to the communications field, and in particular, to a resource selection method and an apparatus.

BACKGROUND

Device-to-device (D2D for short) communication refers to direct communication between terminals without forwarding a signal by using a base station. A D2D technology can relieve a burden of a macro network and increase a communication rate between UEs.

Figure 1:
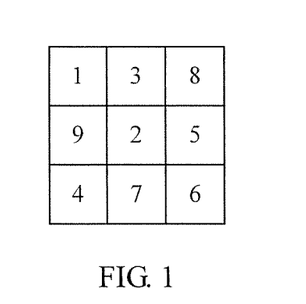
FIG. 1 is a schematic diagram of distribution of a frequency-time resource, in a discovery resource pool, occupied by a discovery signal.

In a discovery function of the D2D communication, a terminal needs to obtain a corresponding frequency-time resource from a resource pool to send a discovery signal. As shown in FIG. 1, assuming that a resource pool can be divided into three time intervals and 3 frequency bands in total, nine (3×3) frequency-time resources are generated altogether. The terminal selects one from the nine frequency-time resources to send a discovery signal of the terminal itself. There are nine terminals (numbered 1 to number 9) altogether, and each terminal occupies one frequency-time resource to send a discovery signal of the terminal itself.

Figure 2:
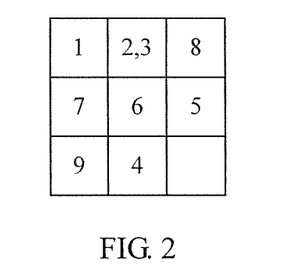
FIG. 2 is a schematic diagram of distribution of a frequency-time resource, in a discovery resource pool, occupied by another discovery signal.

During an implementation process of selecting the frequency-time resource by the terminal, the inventor finds that when a terminal selects a frequency-time resource, multiple terminals may select a same frequency-time resource, as shown in FIG. 2. A terminal 2 and a terminal 3 share one frequency-time resource. As a result, discovery signals sent by the multiple terminals that select the same frequency-time resource interfere with each other, and transmit quality of the discovery signals of the terminals is reduced.

SUMMARY

Embodiments of the present disclosure provide a resource selection method and an apparatus, which can resolve a collision problem occurring when a terminal selects a frequency-time resource, and improve transmit quality of a discovery signal of the terminal.

To achieve the foregoing objective, the following technical solutions are used in the embodiments of the present disclosure:

According to a first aspect, a resource selection method is provided, including:

obtaining, by a terminal, a transmit probability of a discovery signal, where the transmit probability is a probability that the terminal starts to transmit the discovery signal on a predetermined discovery frame by using a discovery resource pool;

generating, by the terminal, an indication signal corresponding to the transmit probability, where the indication signal is used to indicate whether the terminal starts to transmit the discovery signal on the predetermined discovery frame by using the discovery resource pool; and if the indication signal is a transmit indication signal, starting to transmit, by the terminal, the discovery signal on the predetermined discovery frame by using the discovery resource pool.

With reference to the first aspect, in a first possible implementation manner, the obtaining, by a terminal, a transmit probability of a discovery signal includes:

obtaining, by the terminal, a transmit probability preconfigured by the terminal; or receiving, by the terminal, probability information sent by a base station, and obtaining, the transmit probability according to the probability information.

With reference to the first possible implementation manner of the first aspect, in a second possible implementation manner, the receiving, by the terminal, probability information sent by a base station, and obtaining the transmit probability according to the probability information includes:

receiving, by the terminal, the transmit probability sent by the base station; or receiving, by the terminal, a quantity of remaining frequency-time resources in the discovery resource pool and a quantity of terminals that are to transmit discovery signals by using the discovery resource pool, where the quantities are sent by the base station; and calculating, according to the quantity of the remaining frequency-time resources in the discovery resource pool and the quantity of the terminals that are to transmit the discovery signals by using the discovery resource pool, a probability that the terminals that are to transmit the discovery signals by using the discovery resource pool do not occupy a same frequency-time resource; and using the probability that the terminals that are to transmit the discovery signals by using the discovery resource pool do not occupy the same frequency-time resource as the transmit probability.

With reference to the first aspect or the first or the second possible implementation manner of the first aspect, in a third possible implementation manner, the method further includes:

if the indication signal is a not transmit indication signal, obtaining, by the terminal, a new transmit probability, and obtaining a new indication signal according to the new transmit probability.

With reference to the third possible implementation manner of the first aspect, in a fourth possible implementation manner, the method further includes:

if the terminal does not transmit the discovery signal within a predetermined time by using the discovery resource pool, receiving, by the terminal, a final indication signal sent by the base station; and if the final indication signal is a transmit indication signal, starting to transmit, by the terminal, the discovery signal on the predetermined discovery frame by using the discovery resource pool; or if the final indication signal is a transmit cancel signal, cancelling, by the terminal, transmit of the discovery signal performed by using the discovery resource pool.

With reference to the first aspect or any possible implementation manner of the first aspect, the starting to transmit, by the terminal, the discovery signal on the predetermined discovery frame by using the discovery resource pool includes:

transmitting, by the terminal, the discovery signal on the predetermined discovery frame by using a frequency-time resource whose transmit power is less than preset transmit power in the discovery resource pool.

According to a second aspect, a terminal is provided, including:

an obtaining unit, configured to obtain a transmit probability of a discovery signal, where the transmit probability is a probability that the terminal starts to transmit the discovery signal on a predetermined discovery frame by using a discovery resource pool;

a generation unit, configured to generate an indication signal corresponding to the transmit probability, where the indication signal is used to indicate whether the terminal starts to transmit the discovery signal on the predetermined discovery frame by using the discovery resource pool; and a transmitting unit, configured to, if the indication signal is a transmit indication signal, start to transmit the discovery signal on the predetermined discovery frame by using the discovery resource pool.

With reference to the second aspect, in a first possible implementation manner, the obtaining unit is configured to:

obtain a transmit probability preconfigured by the terminal; or receive probability information sent by a base station, and obtain the transmit probability according to the probability information.

With reference to the first possible implementation manner of the second aspect, in a second possible implementation manner, the obtaining unit of the terminal is configured to:

receive the transmit probability sent by the base station; or
the obtaining unit of the terminal includes:

a receiving subunit, configured to receive a quantity of remaining frequency-time resources in the discovery resource pool and a quantity of terminals that are to transmit discovery signals by using the discovery resource pool, where the quantities are sent by the base station; and a calculation subunit, configured to calculate, according to the quantity of the remaining frequency-time resources in the discovery resource pool and the quantity of the terminals that are to transmit the discovery signals by using the discovery resource pool, a probability that the terminals that are to transmit the discovery signals by using the discovery resource pool do not occupy a same frequency-time resource; and use the probability that the terminals that are to transmit the discovery signals by using the discovery resource pool do not occupy the same frequency-time resource as the transmit probability.

With reference to the second aspect or the first or the second possible implementation manner of the second aspect, in a third possible implementation manner, the terminal further includes:

a reselection unit, configured to: if the indication signal generated by the generation unit is a not transmit indication signal, obtain a new transmit probability, and obtain a new indication signal according to the new transmit probability.

With reference to the third possible implementation manner of the second aspect, in a fourth possible implementation manner, the terminal further includes:

a receiving unit, configured to receive, if the terminal does not transmit the discovery signal within a predetermined time by using the discovery resource pool, a final indication signal sent by the base station; where the transmitting unit is configured to, if the final indication signal is a transmit indication signal, start to transmit the discovery signal on the predetermined discovery frame by using the discovery resource pool; and a cancellation unit, configured to cancel, if the final indication signal is a transmit cancel signal, transmit of the discovery signal performed by using the discovery resource pool.

With reference to the second aspect or any possible implementation manner of the second aspect, the transmitting unit is configured to:

transmit the discovery signal on the predetermined discovery frame by using a frequency-time resource whose transmit power is less than preset transmit power in the discovery resource pool.

According to a third aspect, a terminal is provided, including: a processor, a receiver, a transmitter, a memory, and a bus, where the processor, the receiver, and the transmitter are connected by using the bus, and the memory is configured to store data to be processed by the processor;

the processor is configured to obtain a transmit probability of a discovery signal, where the transmit probability is a probability that a terminal starts to transmit the discovery signal on a predetermined discovery frame by using a discovery resource pool;

the processor is further configured to generate an indication signal corresponding to the transmit probability, where the indication signal is used to indicate whether the terminal starts to transmit the discovery signal on the predetermined discovery frame by using the discovery resource pool; and the processor is further configured to, if the indication signal is a transmit indication signal, start to transmit the discovery signal on the predetermined discovery frame by using the discovery resource pool.

With reference to the third aspect, in a first possible implementation manner, the processor is configured to:

obtain a transmit probability preconfigured by the terminal; or receive, by using the receiver, probability information sent by a base station, and obtain the transmit probability according to the probability information.

With reference to the first possible implementation manner of the third aspect, in a second possible implementation manner, the processor is configured to:

receive, by using the receiver, the transmit probability sent by the base station; or receive, by using the receiver, a quantity of remaining frequency-time resources in the discovery resource pool and a quantity of terminals that are to transmit discovery signals by using the discovery resource pool, where the quantities are sent by the base station; and calculate, according to the quantity of the remaining frequency-time resources in the discovery resource pool and the quantity of the terminals that are to transmit the discovery signals by using the discovery resource pool, a probability that the terminals that are to transmit the discovery signals by using the discovery resource pool do not occupy a same frequency-time resource; and use the probability that the terminals that are to transmit the discovery signals by using the discovery resource pool do not occupy the same frequency-time resource as the transmit probability.

With reference to the third aspect or the first or the second possible implementation manner of the third aspect, in a third possible implementation manner, the processor is further configured to:

if the indication signal is a not transmit indication signal, obtain a new transmit probability, and obtain a new indication signal according to the new transmit probability.

With reference to the first possible implementation manner of the third aspect, in a fourth possible implementation manner, the processor is further configured to:

if the terminal does not transmit the discovery signal within a predetermined time by using the discovery resource pool, receive, by using the receiver, a final indication signal sent by the base station; and;

if the final indication signal is a transmit indication signal, start to transmit, by using the transmitter, the discovery signal on the predetermined discovery frame by using the discovery resource pool; or if the final indication signal is a transmit cancel signal, cancel transmit of the discovery signal performed by using the discovery resource pool.

With reference to the third aspect or any possible implementation manner of the third aspect, the processor is configured to:

transmit the discovery signal on the predetermined discovery frame by using a frequency-time resource whose transmit power is less than preset transmit power in the discovery resource pool.

In the foregoing solutions, a terminal obtains a transmit probability of a discovery signal, where the transmit probability is a probability that the terminal starts to transmit the discovery signal on a predetermined discovery frame by using a discovery resource pool; the terminal generates an indication signal corresponding to the transmit probability. If the indication signal is a transmit indication signal, the terminal starts to transmit the discovery signal on the predetermined discovery frame by using the discovery resource pool. In this way, by using the indication signal generated according to the obtained transmit probability, the terminal chooses whether to occupy a frequency-time resource in the discovery resource pool to transmit the discovery signal, which reduces a possibility of a collision occurring when the terminal selects the frequency-time resource, and improves transmit quality of the discovery signal of the terminal.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 3:
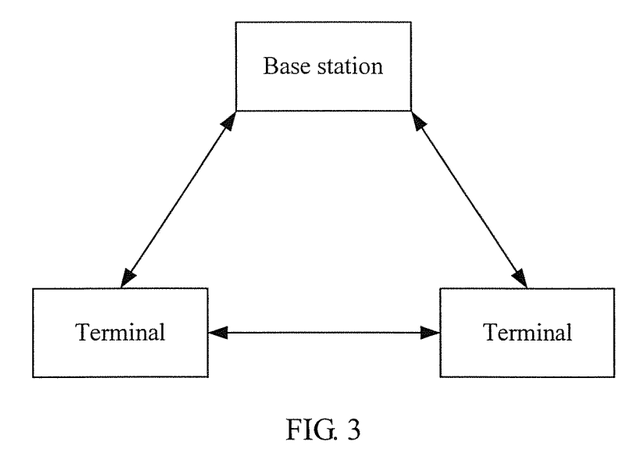
FIG. 3 is a schematic diagram of a D2D communication structure.

An embodiment of the present disclosure is applied to a D2D communications system. As shown in FIG. 3, data is exchanged between terminals in the D2D communications system. For example, a terminal adds a discovery signal to a discovery resource pool and selects a corresponding frequency-time resource to transmit the discovery signal to another terminal. A base station is configured to control a scale of a predetermined discovery frame. If the predetermined discovery frame cannot carry all discovery signals, the base station expands the scale of the predetermined discovery frame (that is, a quantity of frequency-time resources in the predetermined discovery frame). If there is an excessive frequency-time resource in the predetermined discovery frame, the base station reduces the scale of the predetermined discovery frame. The base station controls the terminal, and sends an add signal to the terminal, where the add signal is used to instruct to add the discovery signal of the terminal to a frequency-time resource of the predetermined discovery frame; or, sends an adding cancel signal to the terminal, where the adding cancel signal is used to instruct to separate the discovery signal of the terminal from the frequency-time resource of the predetermined discovery frame; or, sends a frequency hopping signal to the terminal, where the frequency hopping signal is used to instruct the discovery signal of the terminal to jump to another frequency-time resource of the predetermined discovery frame for transmission.

Figure 4:
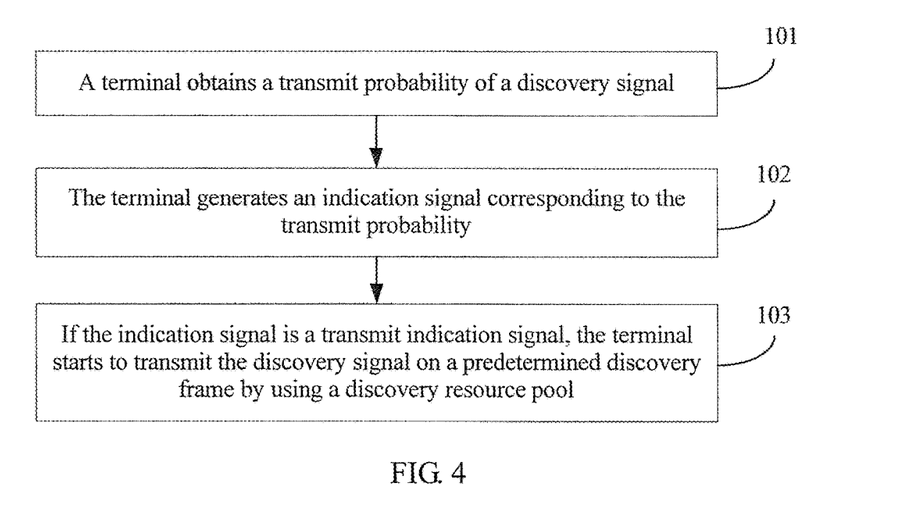
FIG. 4 is a schematic flowchart of a resource selection method according to an embodiment of the present disclosure.

An embodiment of the present disclosure provides a resource selection method. As shown in FIG. 4, the method includes the following steps:

101. A terminal obtains a transmit probability of a discovery signal.

The transmit probability is a probability that the terminal starts to transmit the discovery signal on a predetermined discovery frame by using a discovery resource pool.

Specifically, the transmit probability, of the discovery signal, obtained by the terminal may be preconfigured; or, the terminal receives a transmit probability sent by a base station.

The transmit probability may be a fixed probability (for example, 1/2), or may be a probability sequence (for example, 1/2, 2/3, 3/4 . . . ).

Figure 5:
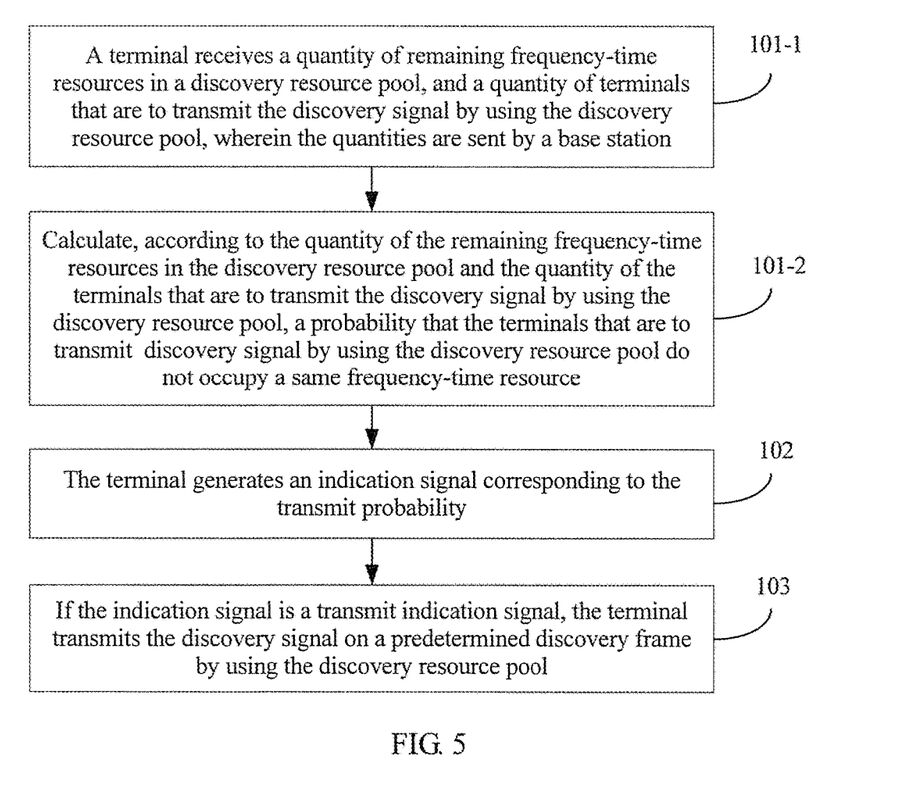
FIG. 5 is a schematic flowchart of a resource selection method according to another embodiment of the present disclosure.

Optionally, as shown in FIG. 5, that the terminal receives probability information sent by the base station and obtains the transmit probability according to the probability information includes:

101-1. The terminal receives a quantity of remaining frequency-time resources in the discovery resource pool and a quantity of terminals that are to transmit discovery signals by using the discovery resource pool, where the quantities are sent by a base station.

101-2. Calculate, according to the quantity of the remaining frequency-time resources in the discovery resource pool and the quantity of the terminals that are to transmit the discovery signals by using the discovery resource pool, a probability that the terminals that are to transmit the discovery signals by using the discovery resource pool do not occupy a same frequency-time resource.

The probability that the terminals that are to transmit the discovery signals by using the discovery resource pool do not occupy the same frequency-time resource is used as the transmit probability.

Assuming that the quantity of the remaining frequency-time resources in the predetermined discovery frame is M, and a quantity of discovery signals, of the terminal, that are to be added to the discovery resource pool is N, a probability that the discovery signals, of the terminal, that are to be added to the discovery resource pool do not occupy a same frequency-time resource is:

$$\frac{M \times (M-1) \times \ldots \times (M-N+1)}{M^N}$$

For example, if the quantity of the remaining frequency-time resources in the predetermined discovery frame is 4, and the quantity of the discovery signals, of the terminal, that are to be added to the discovery resource pool is 3, the probability that the discovery signals, of the terminal, that are to be added to the discovery resource pool do not occupy the same frequency-time resource is 3/8, and the transmit probability is 3/8.

102. The terminal generates an indication signal corresponding to the transmit probability.

The indication signal is used to indicate whether the terminal starts to transmit the discovery signal on the predetermined discovery frame by using the discovery resource pool.

Exemplarily, if the transmit probability is 2/3, there is a 2/3 probability that the generated indication signal is a signal indicating adding, that is, the indication signal is used to indicate that the terminal adds the discovery signal to the discovery resource pool corresponding to the predetermined discovery frame; in addition, there is a 1/3 probability that the generated indication signal is a signal indicating not adding, that is, the indication signal is used to indicate that the terminal does not add the discovery signal to the discovery resource pool corresponding to the predetermined discovery frame. In this way, a probability that discovery signals added to the discovery resource pool collide with each other is reduced (no collision occurs in the sense of probability), and transmit quality of the discovery signal of the terminal is improved.

If the transmit probability is a probability sequence, a corresponding probability in the probability sequence is used. For example, if the probability sequence is: 1/2, 2/3, 3/4 . . . , the first generation of an indication signal is performed according to the probability 1/2, and the second generation of an indication signal is performed according to the probability 2/3.

103. If the indication signal is a transmit indication signal, the terminal starts to transmit the discovery signal on a predetermined discovery frame by using the discovery resource pool.

Optionally, step 103 may further be: if the indication signal is the transmit indication signal, the terminal transmits the discovery signal on the predetermined discovery frame by using a frequency-time resource whose transmit power is less than preset transmit power in the discovery resource pool.

In the discovery resource pool, a frequency-time resource occupied by a discovery signal of another terminal generates transmit power, and as a result, the terminal cannot select the occupied frequency-time resource, and the terminal needs to select a frequency-time resource whose transmit power is less than the preset transmit power (that is, a frequency-time resource not occupied), to transmit the discovery signal. In this way, a collision between an added discovery signal and an original discovery signal on the predetermined discovery frame does not occur.

In the foregoing embodiment, a terminal obtains a transmit probability of a discovery signal, where the transmit probability is a probability that the terminal starts to transmit the discovery signal on a predetermined discovery frame by using a discovery resource pool; the terminal generates an indication signal corresponding to the transmit probability. If the indication signal is a transmit indication signal, the terminal starts to transmit the discovery signal on the predetermined discovery frame by using the discovery resource pool. In this way, by using the indication signal generated according to the obtained transmit probability, the terminal chooses whether to occupy a frequency-time resource in the discovery resource pool to transmit the discovery signal, which reduces a possibility of a collision occurring when the terminal selects the frequency-time resource, and improves transmit quality of the discovery signal of the terminal.

Figure 6:
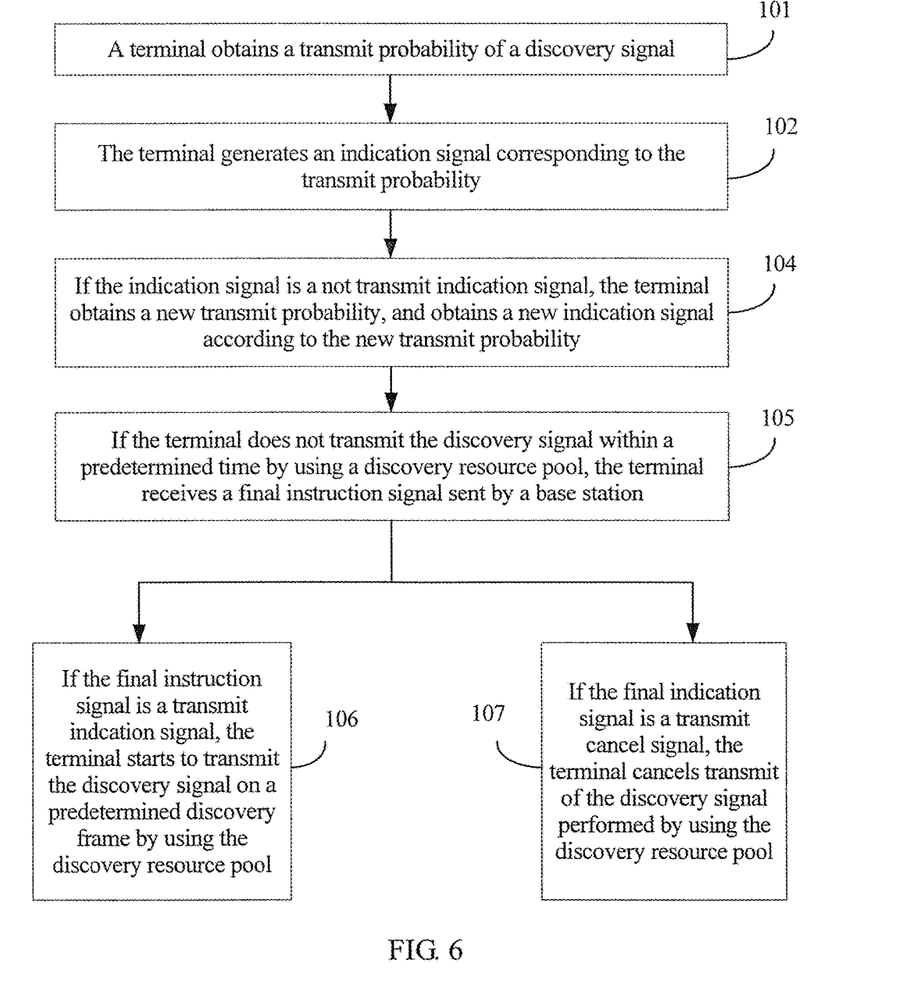
FIG. 6 is a schematic flowchart of a resource selection method according to still another embodiment of the present disclosure.

Optionally, an embodiment of the present disclosure provides a resource selection method. As shown in FIG. 6, the method includes:

step 101 and step 102 in the foregoing embodiment, and details are not described herein.

After step 102, the method further includes:

104. If the indication signal is a not transmit indication signal, the terminal obtains a new transmit probability, and obtains a new indication signal according to the new transmit probability.

If the indication signal generated by the terminal is the not transmit indication signal, the terminal fails to add the discovery signal to the discovery resource pool for the first time, and the terminal needs to obtain the new transmit probability. According to the transmit probability in step 101, when the transmit probability is a fixed probability, for example, 1/2, the new obtained transmit probability is also 1/2, and a new indication signal is generated according to the probability 1/2, and it is determined, according to the indication signal, whether to select a frequency-time resource.

Optionally, when the transmit probability is the probability sequence, for example, 1/2, 2/3, 3/4, . . . , the second probability is selected as the transmit probability, that is, 2/3 is selected as the transmit probability, and an indication signal is generated according to the new transmit probability 2/3, and it is determined, according to the indication signal, whether to select the frequency-time resource. For all discovery signals, of the terminals, added to the discovery resource pool, some terminals have generated signals indicating adding at the first time, that is, discovery signals of some terminals have been added to the discovery resource pool, and start to be transmitted; therefore, a probability that remaining discovery signals of terminals collide with each other is reduced, probabilities in the probability sequence increase gradually, and a probability that a discovery signal is added to the discovery resource pool accordingly increases, which reduces a total time for adding the discovery signal to the discovery resource pool.

105. If the terminal does not transmit the discovery signal within a predetermined time by using the discovery resource pool, the terminal receives a final indication signal sent by the base station.

Figure 7:
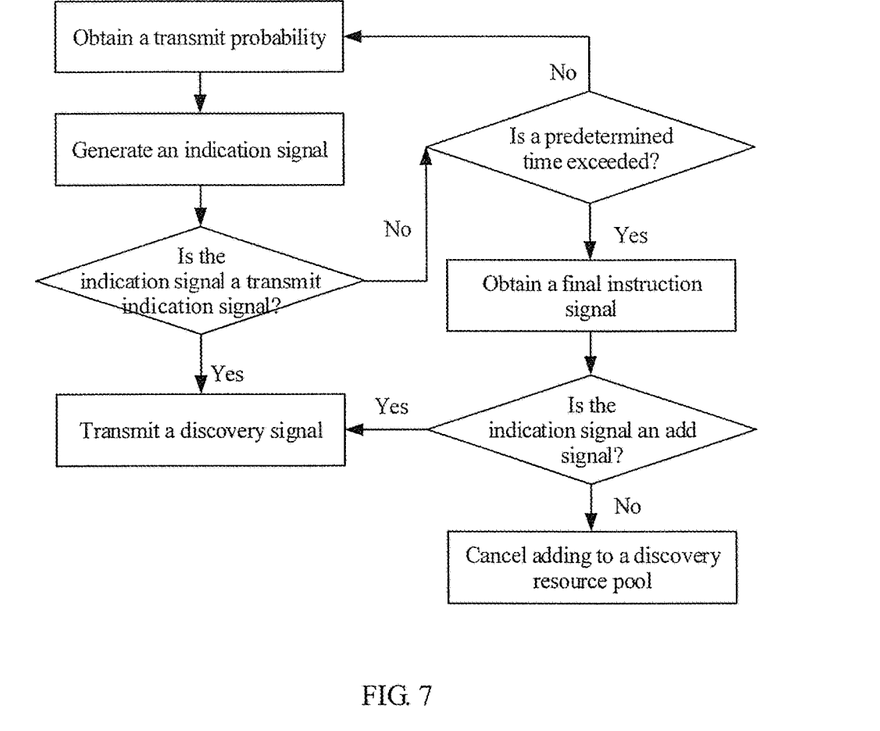
FIG. 7 is a flowchart of a resource selection method according to an embodiment of the present disclosure.

Specifically, as shown in FIG. 7, the terminal generates the indication signal corresponding to the transmit probability. If the generated indication signal is always the not transmit indication signal, the terminal does not transmit the discovery signal by using the discovery resource pool, and the terminal needs to receive the final indication signal sent by the base station, so as to ensure that the discovery signal can be sent properly by using the discovery resource pool.

106. If the final indication signal is a transmit indication signal, the terminal starts to transmit the discovery signal on the predetermined discovery frame by using the discovery resource pool.

When the terminal does not transmit the discovery signal within the predetermined time by using the discovery resource pool, if the discovery resource pool has a remaining frequency-time resource, when the final indication signal sent by the base station and received by the terminal is the transmit indication signal, the terminal is instructed to transmit the discovery signal by using the discovery resource pool.

107. When the final indication signal is a transmit cancel signal, the terminal cancels transmit of the discovery signal performed by using the discovery resource pool.

When the terminal does not transmit the discovery signal within the predetermined time by using the discovery resource pool, if all frequency-time resources in the discovery resource pool are occupied, when the final indication signal sent by the base station and received by the terminal is the transmit cancel signal, the terminal is instructed to cancel transmit of the discovery signal performed by using the discovery resource pool.

Figure 8:
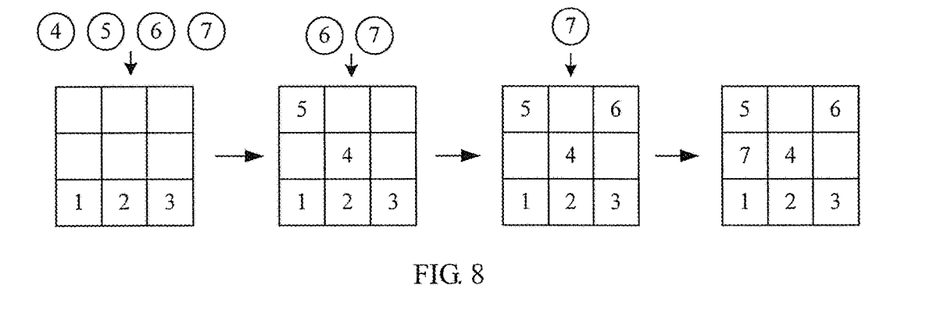
FIG. 8 is a schematic diagram of a resource selection method according to an embodiment of the present disclosure.

Exemplarily, as shown in FIG. 8, there are 9 frequency-time resources in the discovery resource pool in total. A discovery signal of a first terminal (identified as 1 in the figure, and the other discovery signals are identified in a same way, which are not described herein), a discovery signal of a second terminal, and a discovery signal of a third terminal are added to the discovery resource pool on a frame previous to the predetermined discovery frame. As a result, there are 6 frequency-time resources left. Assuming that discovery signals of four terminals (which are a fourth terminal, a fifth terminal, a sixth terminal, and a seventh terminal) need to be added to the discovery resource pool on the predetermined discovery frame, a probability that the discovery signals of the four terminals collide with each other when being added to the discovery resource pool is 13/18. In this embodiment of the present disclosure, assuming that the transmit probability obtained by each terminal is 1/2, when the four terminals generate indication signals corresponding to the transmit probability, there is a 1/2 probability that the indication signals are signals indicating adding the discovery signals to the discovery resource pool, and there is a 1/2 probability that the indication signals are signals indicating not adding the discovery signals to the discovery resource pool. Because the transmit probability is 1/2, assuming that, on a next discovery frame (referred to as a first discovery frame), two terminals (the fourth terminal and the fifth terminal) generate indication signals indicating adding the discovery signals to the discovery resource pool, and the other two terminals (the sixth terminal and the seventh terminal) generate signals indicating not adding the discovery signals to the discovery resource pool, a probability that a discovery signal of the fourth terminal collides with a discovery signal of the fifth terminal is 1/6; subsequently, the remaining two terminals obtain the transmit probability, and the transmit probability obtained by each terminal is 1/2. Because the transmit probability is 1/2, assuming that, on a second discovery frame, the sixth terminal generates an indication signal indicating adding the discovery signal to the discovery resource pool, and the seventh terminal generates an indication signal not indicating adding the discovery signal to the discovery resource pool, the discovery signal of the sixth terminal is added to the discovery resource pool separately, and no collision occurs. Finally, if the seventh terminal generates, within the predetermined time, an indication signal indicating adding the discovery signal to the discovery resource pool, the discovery signal of the seventh terminal is added to the discovery resource pool separately, and no collision occurs. If the seventh terminal does not generate, within the predetermined time, the indication signal indicating adding the discovery signal to the discovery resource pool, the seventh terminal receives a final indication signal sent by the base station, and because the discovery resource pool has a remaining frequency-time resource, the final indication signal instructs to add the discovery signal of the seventh terminal to the discovery resource pool; therefore, the discovery signal of the seventh terminal is added to the discovery resource pool separately, and no collision occurs. In this example, a collision probability is 13/18 in a method in the prior art, and a collision probability is 1/6 in this embodiment of the present disclosure; therefore, a probability of a collision occurring when a terminal selects a frequency-time resources is reduced, and transmit quality of the discovery signal of the terminal is improved.

Figure 9:
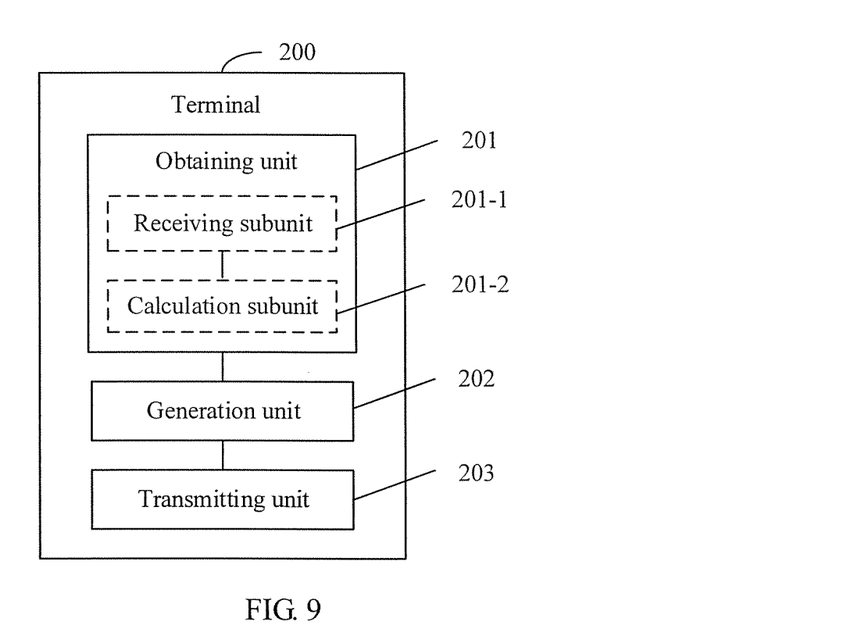
FIG. 9 is a schematic structural diagram of a terminal according to an embodiment of the present disclosure.

An embodiment of the present disclosure provides a terminal 200, which is applied to selection of a frequency-time resource in D2D communication. As shown in FIG. 9, the terminal 200 includes:

an obtaining unit 201, configured to obtain a transmit probability of a discovery signal.

The transmit probability is a probability that the terminal starts to transmit the discovery signal on a predetermined discovery frame by using a discovery resource pool.

The transmit probability may be a fixed probability (for example, 1/2), or may be a probability sequence (for example, 1/2, 2/3, 3/4 . . . ).

The obtaining unit 201 is configured to: obtain a transmit probability preconfigured by the terminal; or, receive a transmit probability sent by a base station.

Optionally, the obtaining unit 201 includes:

a receiving subunit 201-1, configured to receive a quantity of remaining frequency-time resources in the discovery resource pool and a quantity of terminals that are to transmit discovery signals by using the discovery resource pool, where the quantities are sent by the base station; and a calculating subunit 201-2, configured to calculate, according to the quantity of the remaining frequency-time resources in the discovery resource pool and the quantity of the terminals that are to transmit the discovery signals by using the discovery resource pool, a probability that the terminals that are to transmit the discovery signals by using the discovery resource pool do not occupy a same frequency-time resource; and use the probability that the terminals that are to transmit the discovery signals by using the discovery resource pool do not occupy the same frequency-time resource as the transmit probability.

Further, the terminal 200 further includes:

a generation unit 202, configured to generate an indication signal corresponding to the transmit probability, where the indication signal is used to indicate whether the terminal starts to transmit the discovery signal on the predetermined discovery frame by using the discovery resource pool; and a transmitting unit 203, configured to, if the indication signal is a transmit indication signal, start to transmit the discovery signal on the predetermined discovery frame by using the discovery resource pool.

Optionally, the transmitting unit 203 is configured to, if the indication signal is the transmit indication signal, transmit the discovery signal on the predetermined discovery frame by using a frequency-time resource whose transmit power is less than preset transmit power in the discovery resource pool.

In the discovery resource pool, a frequency-time resource occupied by a discovery signal of another terminal generates transmit power, and as a result, the terminal cannot select the occupied frequency-time resource, and the terminal needs to select a frequency-time resource whose transmit power is less than the preset transmit power (that is, a frequency-time resource not occupied), to transmit the discovery signal. In this way, a collision between an added discovery signal and an original discovery signal on the predetermined discovery frame does not occur.

Figure 10:
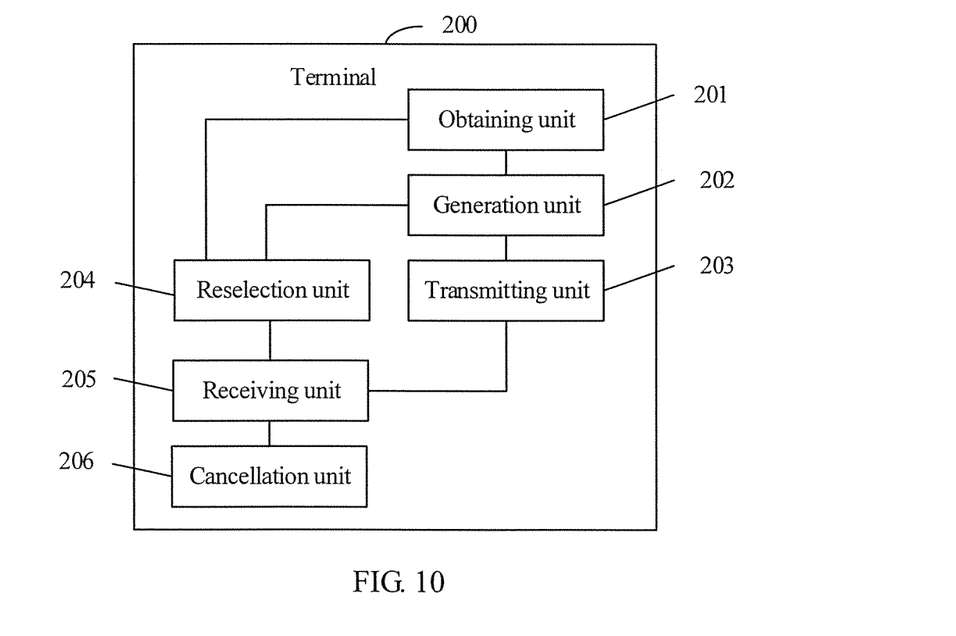
FIG. 10 is a schematic structural diagram of a terminal according to another embodiment of the present disclosure.

Optionally, as shown in FIG. 10, the terminal 200 further includes:

a reselection unit 204, configured to: if the indication signal generated by the generation unit 202 is a not transmit indication signal, obtain a new transmit probability, and obtain a new indication signal according to the new transmit probability.

Further, optionally, the terminal 200 further includes:

The receiving unit 205 is configured to, if the terminal does not transmit the discovery signal within the predetermined time by using the discovery resource pool, receive a final indication signal sent by the base station.

Specifically, the terminal generates the indication signal corresponding to the transmit probability. If the generated indication signal is always the not transmit indication signal, the terminal does not transmit the discovery signal by using the discovery resource pool, and the terminal needs to receive the final indication signal sent by the base station, so as to ensure that the discovery signal can be sent properly by using the discovery resource pool.

The transmitting unit 203 is further configured to, if the final indication signal received by the receiving unit 205 is the transmit indication signal, start to transmit the discovery signal on the predetermined discovery frame by using the discovery resource pool.

When the terminal does not transmit the discovery signal within the predetermined time by using the discovery resource pool, if the discovery resource pool has a remaining frequency-time resource, when the final indication signal sent by the base station and received by the terminal is the transmit indication signal, the terminal is instructed to transmit the discovery signal by using the discovery resource pool.

The cancellation unit 206 is configured to, if the final indication signal received by the receiving unit 205 is a transmit cancel signal, cancel, by the terminal, transmit of the discovery signal performed by using the discovery resource pool.

When the terminal does not transmit the discovery signal within the predetermined time by using the discovery resource pool, if all frequency-time resources in the discovery resource pool are occupied, when the final indication signal sent by the base station and received by the terminal is the transmit cancel signal, the terminal is instructed to cancel transmit of the discovery signal performed by using the discovery resource pool.

In the foregoing embodiment, a terminal obtains a transmit probability of a discovery signal, where the transmit probability is a probability that the terminal starts to transmit the discovery signal on a predetermined discovery frame by using a discovery resource pool; the terminal generates an indication signal corresponding to the transmit probability. If the indication signal is a transmit indication signal, the terminal starts to transmit the discovery signal on the predetermined discovery frame by using the discovery resource pool. In this way, by using the indication signal generated according to the obtained transmit probability, the terminal chooses whether to occupy a frequency-time resource in the discovery resource pool to transmit the discovery signal, which reduces a possibility of a collision occurring when the terminal selects the frequency-time resource, and improves transmit quality of the discovery signal of the terminal.

Figure 11:
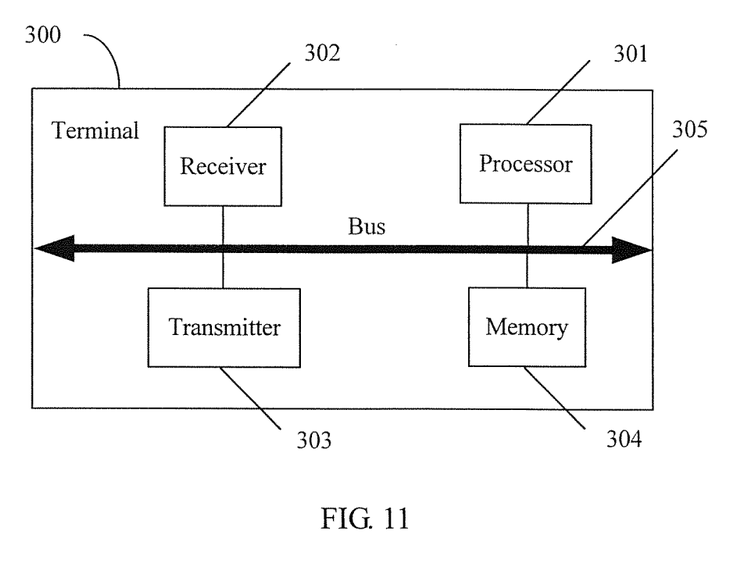
FIG. 11 is a schematic structural diagram of a terminal according to still another embodiment of the present disclosure.

An embodiment of the present disclosure provides a terminal 300, which is applied to selection of a frequency-time resource in D2D communication. As shown in FIG. 11, the terminal 300 includes: a processor 301, a receiver 302, a transmitter 303, a memory 304, and a bus 305, where the processor 301, the receiver 302, and the transmitter 303 are connected by using the bus 305, and the memory 304 is configured to store data to be processed by the processor.

The bus 305 may be an ISA (Industry Standard Architecture, industry standard architecture) bus, a PCI (Peripheral Component, peripheral component interconnect) bus, or an EISA (Extended Industry Standard Architecture, Extended Industry Standard Architecture) bus, and the like. The bus 305 may be categorized into an address bus, a data bus, a control bus, and the like. For ease of denotation, only one bold line is used in FIG. 11 to represent the bus, which, however, does not indicate that there is only one bus or only one type of bus.

The memory 304 is configured to store executable program code, where the program code includes a computer operation instruction. The memory 304 may include a high-speed RAM memory, and may further include a non-volatile memory (non-volatile memory), for example, at least one magnetic disk memory.

The processor 301 may be a central processing unit (Central Processing Unit, CPU for short), or an application specific integrated circuit (Application Specific Integrated Circuit, ASIC for short), or one or more integrated circuits configured to implement the embodiments of the present disclosure.

The processor 301 is configured to obtain a transmit probability of a discovery signal.

The transmit probability is a probability that the terminal starts to transmit the discovery signal on a predetermined discovery frame by using a discovery resource pool.

The transmit probability may be a fixed probability (for example, 1/2), or may be a probability sequence (for example, 1/2, 2/3, 3/4 . . . ).

Specifically, the processor 301 is configured to obtain a transmit probability preconfigured by the terminal, or receive, by using the receiver 302, a transmit probability sent by a base station.

Optionally, the transmit probability of the discovery signal is obtained, and the processor 301 is configured to:

receive, by using the receiver, a quantity of remaining frequency-time resources in the discovery resource pool and a quantity of terminals that are to transmit discovery signals by using the discovery resource pool, where the quantities are sent by the base station; and calculate, according to the quantity of the remaining frequency-time resources in the discovery resource pool and the quantity of the terminals that are to transmit the discovery signals by using the discovery resource pool, a probability that the terminals that are to transmit the discovery signals by using the discovery resource pool do not occupy a same frequency-time resource.

The processor 301 is further configured to generate an indication signal corresponding to the transmit probability.

The indication signal is used to indicate whether the terminal starts to transmit the discovery signal on the predetermined discovery frame by using the discovery resource pool.

The processor 301 is further configured to, if the indication signal is a transmit indication signal, the terminal starts to transmit, by using the transmitter 303, the discovery signal on the predetermined discovery frame by using the discovery resource pool.

Optionally, the processor 301 is configured to, if the indication signal is the transmit indication signal, the terminal transmits the discovery signal on the predetermined discovery frame by using a frequency-time resource whose transmit power is less than preset transmit power in the discovery resource pool.

In the discovery resource pool, a frequency-time resource occupied by a discovery signal of another terminal generates transmit power, and as a result, the terminal cannot select the occupied frequency-time resource, and the terminal needs to select a frequency-time resource whose transmit power is less than the preset transmit power (that is, a frequency-time resource not occupied), to transmit the discovery signal. In this way, a collision between an added discovery signal and an original discovery signal on the predetermined discovery frame does not occur.

Optionally, the processor 301 is further configured to, if the indication signal is a not transmit indication signal, the terminal obtains a new transmit probability, and obtains a new indication signal according to the new transmit probability.

Further, optionally, the processor 301 is further configured to:

if the terminal does not transmit the discovery signal within a predetermined time by using the discovery resource pool, the terminal receives a final indication signal sent by the base station.

Specifically, the terminal generates the indication signal corresponding to the transmit probability. If the generated indication signal is always the not transmit indication signal, the terminal does not transmit the discovery signal by using the discovery resource pool, and the terminal needs to receive the final indication signal sent by the base station, so as to ensure that the discovery signal can be sent properly by using the discovery resource pool.

If the final indication signal is a transmit indication signal, the terminal starts to transmit the discovery signal on the predetermined discovery frame by using the discovery resource pool.

When the terminal does not transmit the discovery signal within the predetermined time by using the discovery resource pool, if the discovery resource pool has a remaining frequency-time resource, when the final indication signal sent by the base station and received by the terminal is the transmit indication signal, the terminal is instructed to transmit the discovery signal by using the discovery resource pool.

If the final indication signal is a transmit cancel signal, the terminal cancels transmit of the discovery signal performed by using the discovery resource pool.

When the terminal does not transmit the discovery signal within the predetermined time by using the discovery resource pool, if all frequency-time resources in the discovery resource pool are occupied, when the final indication signal sent by the base station and received by the terminal is the transmit cancel signal, the terminal is instructed to cancel transmit of the discovery signal performed by using the discovery resource pool.

In the foregoing embodiment, a terminal obtains a transmit probability of a discovery signal, where the transmit probability is a probability that the terminal starts to transmit the discovery signal on a predetermined discovery frame by using a discovery resource pool; the terminal generates an indication signal corresponding to the transmit probability. If the indication signal is a transmit indication signal, the terminal starts to transmit the discovery signal on the predetermined discovery frame by using the discovery resource pool. In this way, by using the indication signal generated according to the obtained transmit probability, the terminal chooses whether to occupy a frequency-time resource in the discovery resource pool to transmit the discovery signal, which reduces a possibility of a collision occurring when the terminal selects the frequency-time resource, and improves transmit quality of the discovery signal of the terminal.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A resource selection method, comprising:
   obtaining, by a terminal, a transmit probability of a discovery signal, wherein the transmit probability is a probability that the terminal starts to transmit the discovery signal on a predetermined discovery frame by using a discovery resource pool;
   generating, by the terminal, an indication signal corresponding to the transmit probability for indicating whether the terminal starts to transmit the discovery signal on the predetermined discovery frame by using the discovery resource pool;
   when the indication signal is a transmit indication signal, starting to transmit, by the terminal, the discovery signal on the predetermined discovery frame by using the discovery resource pool;
   when the indication signal is a not transmit indication signal, obtaining, by the terminal, a new transmit probability, and obtaining a new indication signal according to the new transmit probability;

when the terminal does not transmit the discovery signal within a predetermined time by using the discovery resource pool, receiving, by the terminal, a final indication signal sent by the base station; and when the final indication signal is a transmit indication signal, starting to transmit, by the terminal, the discovery signal on the predetermined discovery frame by using the discovery resource pool.

2. The method according to claim 1, wherein obtaining, by the terminal, the transmit probability of the discovery signal comprises:

obtaining, by the terminal, a transmit probability preconfigured by the terminal; or receiving, by the terminal, probability information sent by a base station, and obtaining the transmit probability according to the probability information.

3. The method according to claim 2, wherein receiving, by the terminal, the probability information sent by the base station, and obtaining the transmit probability according to the probability information comprises:

receiving, by the terminal, the transmit probability sent by the base station; or receiving, by the terminal, a quantity of remaining frequency-time resources in the discovery resource pool and a quantity of terminals that are to transmit the discovery signals by using the discovery resource pool, wherein the quantities are sent by the base station; and calculating, according to the quantity of the remaining frequency-time resources in the discovery resource pool and the quantity of the terminals that are to transmit the discovery signals by using the discovery resource pool, a probability that the terminals that are to transmit the discovery signals by using the discovery resource pool do not occupy a same frequency-time resource; and using the probability that the terminals that are to transmit the discovery signals by using the discovery resource pool do not occupy the same frequency-time resource as the transmit probability.

4. The method according to claim 1, wherein starting to transmit, by the terminal, the discovery signal on the predetermined discovery frame by using the discovery resource pool comprises:

transmitting, by the terminal, the discovery signal on the predetermined discovery frame by using a frequency-time resource whose transmit power is less than a preset transmit power in the discovery resource pool.

5. A terminal, comprising:

a processor; and memory coupled to the processor, the memory comprising instructions that, when executed by the processor, cause the terminal to:

obtain a transmit probability of a discovery signal, wherein the transmit probability is a probability that the terminal starts to transmit the discovery signal on a predetermined discovery frame by using a discovery resource pool;

generate an indication signal corresponding to the transmit probability for indicating whether the terminal starts to transmit the discovery signal on the predetermined discovery frame by using the discovery resource pool;

when the indication signal is a transmit indication signal, start to transmit the discovery signal on the predetermined discovery frame by using the discovery resource pool;

when the indication signal is a not transmit indication signal, obtain a new transmit probability, and obtain a new indication signal according to the new transmit probability;

receive, when the terminal does not transmit the discovery signal within a predetermined time by using the discovery resource pool, a final indication signal sent by the base station;

when the final indication signal is a transmit indication signal, start to transmit the discovery signal on the predetermined discovery frame by using, the discovery resource pool; and cancel, when the final indication signal is a transmit cancel signal, transmission of the discovery signal performed by using the discovery resource pool.

6. The terminal according to claim 5, wherein the instructions, when executed by the processor, cause the terminal to:

obtain a transmit probability preconfigured by the terminal; or receive probability information sent by a base station, and obtain the transmit probability according to the probability information.

7. The terminal according to claim 6, wherein the instructions, when executed by the processor, cause the terminal to:

receive the transmit probability sent by the base station; or receive a quantity of remaining frequency-time resources in the discovery resource pool and a quantity of terminals that are to transmit discovery signals by using the discovery resource pool, wherein the quantities are sent by the base station, and calculate, according to the quantity of the remaining frequency-time resources in the discovery resource pool and the quantity of the terminals that are to transmit the discovery signals by using the discovery resource pool, a probability that the terminals that are to transmit the discovery signals by using the discovery resource pool do not occupy a same frequency-time resource; and use the probability that the terminals that are to transmit the discovery signals by using the discovery resource pool do not occupy the same frequency-time resource as the transmit probability.

8. The terminal according to claim 5, wherein the instructions, when executed by the processor, cause the terminal to:

transmit the discovery signal on the predetermined discovery frame by using a frequency-time resource whose transmit power is less than a preset transmit power in the discovery resource pool.

9. A terminal, comprising: a processor, a receiver, a transmitter, a memory, and a bus, wherein the processor, the receiver, and the transmitter are coupled to the bus, and the memory is configured to store data to be processed by the processor;

wherein the terminal is configured to:

obtain a transmit probability of a discovery signal, wherein the transmit probability is a probability that the terminal starts to transmit the discovery signal on a predetermined discovery frame by using a discovery resource pool;

generate an indication signal corresponding to the transmit probability for indicating whether the terminal starts to transmit the discovery signal on the predetermined discovery frame by using the discovery resource pool;

when the indication signal is a transmit indication signal, start to transmit the discovery signal on the predetermined discovery frame by using the discovery resource pool;

when the indication signal is a not transmit indication signal, obtain a new transmit probability, and obtain a new indication signal according to the new transmit probability;

when the terminal does not transmit the discovery signal within a predetermined time by using the discovery resource pool, receive, by using the receiver, a final indication signal sent by a base station; and when the final indication signal is a transmit indication signal, start to transmit, by using the transmitter, the discovery signal on the predetermined discovery frame by using the discovery resource pool.

10. The terminal according to claim 9, wherein the terminal is configured to:

obtain a transmit probability preconfigured by the terminal; or receive, by using the receiver, probability information sent by the base station, and obtain the transmit probability according to the probability information.

11. The terminal according to claim 10, wherein the terminal is configured to:

receive, by using the receiver, the transmit probability sent by the base station; or receive, by using the receiver, a quantity of remaining frequency-time resources in the discovery resource pool and a quantity of terminals that are to transmit the discovery signals by using the discovery resource pool, wherein the quantities are sent by the base station; and calculate, according to the quantity of the remaining frequency-time resources in the discovery resource pool and the quantity of the terminals that are to transmit the discovery signals by using the discovery resource pool, a probability that the terminals that are to transmit the discovery signals by using the discovery resource pool do not occupy a same frequency-time resource; and use the probability that the terminals that are to transmit the discovery signals by using the discovery resource pool do not occupy the same frequency-time resource as the transmit probability.

12. The terminal according to claim 9, wherein the terminal is configured to:

transmit the discovery signal on the predetermined discovery frame by using a frequency-time resource whose transmit power is less than a preset transmit power in the discovery resource pool.

13. A resource selection method, comprising:

obtaining, by a terminal, a transmit probability of a discovery signal, wherein the transmit probability is a probability that the terminal starts to transmit the discovery signal on a predetermined discovery frame by using a discovery resource pool;

generating, by the terminal, an indication signal corresponding to the transmit probability for indicating whether the terminal starts to transmit the discovery signal on the predetermined discovery frame by using the discovery resource pool;

when the indication signal is a transmit indication signal, starting to transmit, by the terminal, the discovery signal on the predetermined discovery frame by using the discovery resource pool;

when the indication signal is a not a transmit indication signal, obtaining, by the terminal, a new transmit probability, and obtaining a new indication signal according to the new transmit probability;

when the terminal does not transmit the discovery signal within a predetermined time by using the discovery resource pool, receiving, by the terminal, a final indication signal sent by the base station; and when the final indication signal is a transmit cancel signal, cancelling, by the terminal, transmission of the discovery signal performed by using the discovery resource pool.

14. A terminal, comprising: a processor, a receiver, a transmitter, a memory, and a bus, wherein the processor, the receiver, and the transmitter are coupled to the bus, and the memory is configured to store data to be processed by the processor;

wherein the terminal is configured to:

obtain a transmit probability of a discovery signal, wherein the transmit probability is a probability that the terminal starts to transmit the discovery signal on a predetermined discovery frame by using a discovery resource pool, generate an indication signal corresponding to the transmit probability for indicating whether the terminal starts to transmit the discovery signal on the predetermined discovery frame by using the discovery resource pool, when the indication signal is a transmit indication signal, start to transmit the discovery signal on the predetermined discovery frame by using the discovery resource pool, when the indication signal is a not a transmit indication signal, obtain a new transmit probability, and obtain a new indication signal according to the new transmit probability, when the terminal does not transmit the discovery signal within a predetermined time by using the discovery resource pool, receive a final indication signal sent by the base station; and when the final indication signal is a transmit cancel signal, cancel transmission of the discovery signal performed by using the discovery resource pool.

* * * * *